Nov. 25, 1958 F. E. SHOCK 2,861,411
ROTARY REEL MOWER

Filed May 7, 1956 2 Sheets-Sheet 1

INVENTOR.
FRANK E. SHOCK
BY
John H. Widdowson
ATTORNEY

Nov. 25, 1958   F. E. SHOCK   2,861,411
ROTARY REEL MOWER

Filed May 7, 1956   2 Sheets-Sheet 2

INVENTOR.
FRANK E. SHOCK

BY *John H. Widdowson*
ATTORNEY

United States Patent Office

2,861,411
Patented Nov. 25, 1958

2,861,411

ROTARY REEL MOWER

Frank E. Shock, Wichita, Kans.

Application May 7, 1956, Serial No. 583,023

3 Claims. (Cl. 56—26)

This invention relates to mowers. In a more specific aspect this invention relates to power lawn mowers. In a still more specific aspect this invention relates to a reel type power lawn mower which has the reel mounted forward for close cutting up to an object, such as a tree or fence, or for cutting under an object, such as under the branches of a tree or shrub, and which can be used to cut up very close to a house, wall, or the like, and which because of its structure can be used not only to cut grass, weeds, and the like, but also to catch such when cut.

Power lawn mowers utilizing a reel cutter and shear blade have long been known in the art, and such are known with the reel and shear blade mounted forward. All of the known mowers have their disadvantages because of their structure, either they cannot be used to mow up close to a tree, or under a shrub, or they cannot be used to trim along the side of a house or wall. Some of the known mower structure, particularly those with front cutter reels do not lend themselves to catching the grass clippings cut, and they are not adaptable for grass catchers usually used to catch the grass clippings. A new reel type mower lawn mower has long been needed in the art, a mower which will cut close to and under the normal objects encountered in mowing, and which will allow catching of the grass clippings with a usual grass catcher. I have invented such a mower structure which utilizes the usual gasoline engine or electric motor power means in a structure mounting same and having reel and mower power wheel drive mechanism and clutch mechanism which does not interfere with catching grass clippings in a usual grass catcher, and which provides for cutting along a wall with practically no clearance between the wall and one end of the cutting reel and shear blade. And, the new mower structure of my invention providing for such results can be made with a single forward mounted reel assembly, which from the standpoint of manufacture and maintenance is very economical and efficient.

The new mower means of my invention has a frame with an upper transverse member and side members attached thereto. A support wheel for the mower is mounted on the inside of one of the side members of the frame. A second support wheel is mounted on the other of said side members. At least one of these wheels is a mower drive wheel, preferably both of them are drive wheels. A cutting reel and a shear blade are transversely mounted in operative relation between the side members forward of the mower wheels. And, the frame is open centrally between the side members and between the side members and below the upper transverse member from the shear blade rearward with substantially no obstruction to passage of grass cut by the reel and shear blade and thrown rearwardly therefrom. The mower power means is mounted on the frame and means are provided to operatively connect this power means and the cutting reel. Also, means, preferably disengageable means, are provided operatively connecting the power means and the mower drive wheel or wheels. The new mower of my invention preferably has clutch means to engage the wheels with the disengageable means connecting same with the power means, and I prefer to provide means to steer the mower in operation. An important feature of my new mower structure is that no portion of the mower is substantially beyond the reel and shear blade on one end thereof, so that close cutting to buildings and walls can be accomplished.

It is an object of this invention to provide new mower means.

It is another object of this invention to provide new reel type power lawn mower means.

It is still another object of this invention to provide new power lawn mower means of the reel type which can be used to cut up to or under an object, and which can be used to cut close to a building or wall, or the like, and which can utilize the usual grass catcher to catch the grass clippings cut by the mower.

Other objects and advantages of the new mower means of my invention will become apparent to those skilled in the art upon reading this disclosure.

Drawings accompany and are a part of this disclosure. These drawings depict preferred specific embodiments of the new mower means of my invention, and it is to be understood that such are not to unduly limit the scope of my invention.

In the drawings, Fig. 1 is a perspective view, partly broken away and partly in section, of a preferred specific embodiment of the new mower means of my invention.

Figures 1, 3:
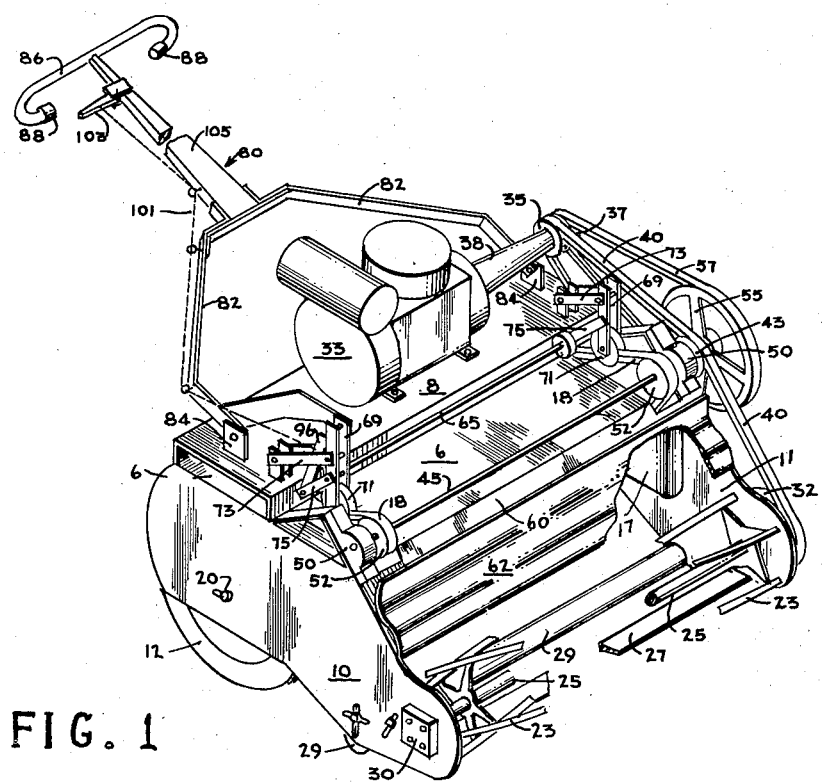
Fig. 3 is an enlarged perspective view of the mower clutch means.
Figure 2:
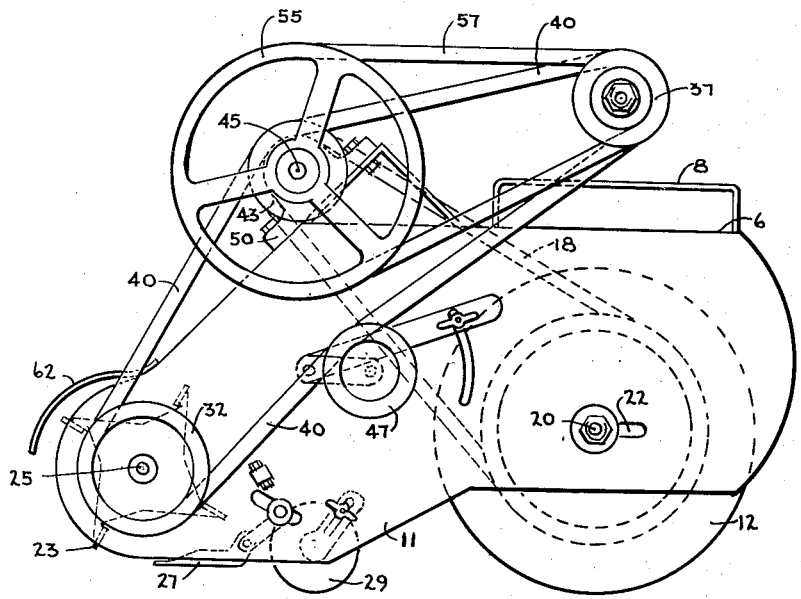
Fig. 2 is an enlarged side elevation view of the mower. The mower handle and motor have been omitted from this view.

Following is a discussion and description of the new mower means of my invention made with reference to the drawings wherein the same reference numerals are used to indicate the same parts or structure. The discussion and description is of preferred specific embodiments of the new mower means of my invention, and it is to be understood that such is not to unduly limit the scope of my invention.

Figure 4:
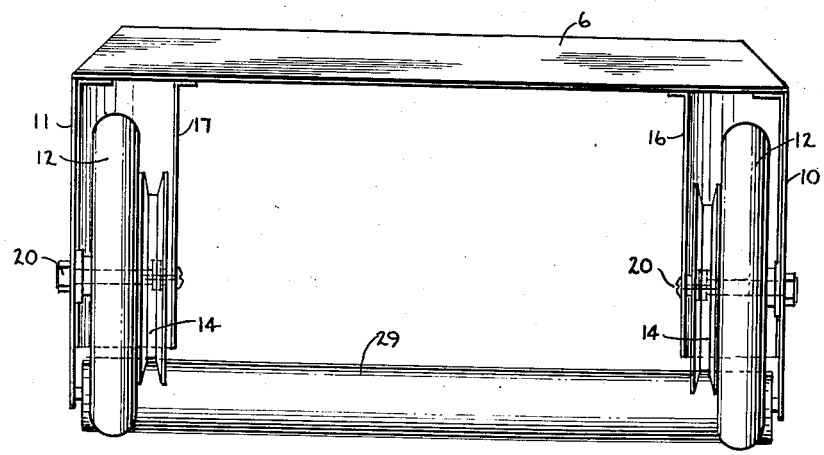
Fig. 4 is an enlarged rear elevation view of the mower frame, showing in detail the mounting of the mower drive wheels.

The new power mower of my invention has a frame having an upper transverse member 6, and this upper member preferably has a superstructure portion 8 on which are mounted mower operating parts as will be seen hereinafter. The frame has side members 10 and 11 which are mirror images of each other and which are attached to top member 6 on the ends thereof in any suitable manner, and these side members extend downwardly and forwardly. Each of said side members 10 and 11 has a mower drive wheel 12 mounted on the inside thereof in the rear portion of the side members below upper frame member 6 (Fig. 4), and each drive wheel has a drive pulley 14 mounted thereon to turn the wheel. I prefer that each of the frame sides 10 and 11 have an inner member 16 and 17, respectively, spaced from members 10 and 11 in the rear portion, with the side members 10 and 11, and 16 and 17, respectively, 16 joining forward of wheels 12 to shield the wheel 12, pulley 14 and its drive belt 18 from grass clippings cut by the mower. Members 16 and 17 are attached to frame members 6 and 10 and 11, respectively, in any suitable manner such as by welding them thereto. Nut and bolt assemblies 20 through the wheel 12 and pulley 14 hubs and frame members 10 and 11, and 16 and 17, respectively, 16 are desirable to mount the drive wheels, and mounting of the nut and bolt assembly 20 in slots 22 in frame members 10 and 11, and 16 and 17 respectively, 16 has been found desirable, making it easy and convenient to adjust wheels 12 to tighten or loosen drive belt 18.

A single transverse cutting reel having blades 23 and central shaft 25 is mounted between side members 10 and 11 forward of the drive wheels 12. An adjustable shear blade 27 and idly mounted ground roller or pony-roller 29 are mounted between side members 10 and 11 in operative relation to the reel. One end of the reel shaft 25 is journaled in a bearing (not shown) mounted in the side member 10, and a small rub block 30 (Fig. 1) covers the bearing. The other end of the reel shaft 25 is journaled in side member 11 and projects therethrough. A drive pulley 32 is mounted on the projecting portion of the shaft 25 to turn same. The rub block 30 is the outermost part on this side of the mower, and such can be made only ⅜ inch thick or less. The end of reel blades 23 on this side of the reel are only the thickness of this block 30 and side member 10 from the outermost point on the mower on the rub block side plus a slight clearance between the reel blades 23 and side member 10. I have made a full size power mower where this distance from the end of the reel blades 23 to the outside of the rub block is less than one inch, providing for a mower which will cut up very close to a wall or building, leaving an uncut strip approximately one inch wide or less. And, as one can see from viewing Fig. 4, my new frame and mounting structure results in openness centrally below upper member 6 and between side members 10 and 16 and 11 and 17, so that practically no obstruction to passage of grass clippings rearwardly is presented. As a result of this very advantageous openness, it is an easy matter to catch grass clippings unobstructedly thrown to the rear below upper member 6, between side members 16 and over roller member 29.

A power unit 33 having a pair of power pulleys 35 and 37 mounted on drive shaft 38 is mounted on frame member 8 in any suitable manner, such as by bolting the base of the power unit to member 8. Power means 33 can conveniently be either a gasoline engine or any electrically driven motor. Power pulley 35 and drive pulley 32 have a pulley belt 40 mounted thereon whereby reel shaft 25 is turned. Belt 40 passes over an idle pulley 43 mounted on shaft 45 and over an idle pulley 47 suitably adjustably mounted on side member 10 so as to work to adjust the tension on belt 40. In operation I find it convenient to drive reel shaft 25 continuously. However, this assembly can be made so as to provide for belt 40 to be disengageable, if desired.

Shaft 45 is mounted for rotation by pillar bearings 50 which are mounted on the mower frame in any suitable manner. A pair of spaced gear pulleys 52 are fixed on shaft 45 to turn therewith, and pulley belts 18 are mounted on these pulleys 52 and drive wheel 12 and pulleys 14. The outer end of shaft 45 has a gear pulley 55 mounted thereon to turn the shaft, and a drive belt 57 operatively connects power pulley 37 and gear pulley 55, so that engine 33 drives wheels 12 when operated and when pulley belts 57 and 18 are in engaged position. I prefer to use V-belts and pulleys therefor for the belt gearing and driving of the reel shaft 25 and mower drive wheels 12. However, any other suitable drive and connecting means can be used, if desired.

I prefer to mount a shield member 60 on side members 10 and 11 of the frame, and I have also found it desirable from a safety standpoint to have a member 62 hingedly joined to member 60 to cover the cutting reel when in operation. These members can, of course, be a single member rigidly mounted on side members 10 and 11.

The new mower structure of my invention readily lends itself to clutch assembly to engage belts 18 in driving relation to pulleys 52 and 14, without interfering with the close clearance features of the mower on one side and with the open frame structure rearward from the grass cutting reel and shear blade, and the ground roller 29. A rotatable shaft 65 is mounted on the mower frame by bearing members 67 suitably attached to the frame. Brackets 68 are welded to frame member 8, and upright spaced arm members 69 mount idle pulleys 71 which in operation engage belts 18 to tighten the belts on pulleys 52 and 14. Links 73 are pivotally connected at their ends to brackets 68 and arm members 69, and links 75 are rigidly connected at their inner ends to shaft 65, and pivotally at their outer ends to arms 69. Arms 69 and idle pulleys 71 move up and down in unison as urged thereto, and spiral spring 77 continuously urges arms 69 and pulleys 71 into raised disengaged position. The mower has a handle assembly 80 with yoke arms 82 thereof pivotally connected to brackets 84 mounted on member 8 of the frame. A curved cross bar 86 with hand grips 88 is suitably attached to the outer end of the handle. I have found it desirable to use the curved outer handle member depicted so as to give close clearance on the one side of the mower when mowing up against a fence or wall. The one yoke arm 82 has an arm 91 fixed thereon to move therewith in any suitable manner. This member in use contacts a pin member 93 mounted in the upper end of arm members 69, so that when the handle is lifted arm 91 forces arm members 69 downwardly and pulleys 71 into engagement with belts 18 to tighten same on pulleys 52 and 14 to drive mower wheels 12. A latch member 96 having notch 98 therein is pivotally mounted on shaft 65, and a spring 99 is mounted on latch 96 and link 75 to urge the latch into engagement with pin 93, this pin catching the latch by notch 98 between arm members 69. When the clutch assembly is in down or engagement position latch 96 holds it there. A clutch operating cable 101 is fastened to latch 96 and an operating lever 103 mounted on handle shank 105. When lever 103 is pulled latch 96 disengages pin 93, allowing spring 77 to release the clutch. While other clutch mechanism can be used with my new mower means, this particular clutch assembly has proven convenient in use.

As will be evident to those skilled in the art, various modifications of this invention can be made, or followed, in the light of this disclosure and discussion, without departing from the spirit or scope of the disclosure or from the scope of the claims.

I claim:

1. A power driven lawn mower, comprising, in combination, a frame having an upper transverse member, each end portion of said transverse member having a pair of downwardly extending side members attached thereto, each pair being spaced in their rear portion and the outer one of each pair extending forward of the inner one of each pair, a mower drive wheel having a drive pulley fixed thereon to turn therewith mounted between each pair of side members in said rear portion thereof, each pair of side members being joined forward of said wheel mounted therebetween to shield same, a single transverse cutting reel mounted between said outer side members forward of said wheels, said reel having a drive pulley operatively connected thereto in one end portion and mounted to turn therewith on the outside of one of said outer side members, an adjustable shear blade mounted between said outer side members in operative relation to said reel, an idler support roller mounted between said outer side members in operative relation to said reel and shear blade, said frame being open centrally between said side members and below said upper member from said roller rearward with substantially no obstruction to passage of grass cut by said reel and shear blade and thrown rearwardly therefrom, power means having a pair of power pulleys mounted on said upper frame member, a pulley belt operatively connecting one of said power pulleys and said reel drive pulley, an idler pulley mounted on said frame and adapted to adjust tension on said pulley belt, a rotatable drive shaft mounted on said upper frame member and having a drive pulley fixed thereon in one end portion thereof and a pulley belt operatively connecting the other of said power pulleys and said shaft drive pulley, said drive shaft having a pair of spaced pulleys mounted thereon to turn therewith and pulley belts operatively connecting these pulleys to said pulleys mounted on said mower drive wheels, a mower handle pivotally mounted on said upper frame member, and releasable clutch means mounted on said upper frame member having idler pulley means adapted to tighten said last-named pulley belts to engage said mower drive wheels in operative relation to said drive shaft, and said mower having no portion substantially beyond said reel and shear blade on one end thereof.

2. The power mower of claim 1 wherein said clutch means comprises a pair of spaced idler pulleys pivotally mounted to move in unison, one of said pulleys engageable with one of said pulley belts to said mower drive wheels and the other of said pulleys engageable with the other of said pulley belts to said mower drive wheels, wherein said mower handle has an arm attached thereto to move therewith, said arm engageable with said clutch means upon raising said handle to engage said idler pulleys thereof with said mower drive wheel pulley belts to tighten same, wherein said clutch has latch means adapted to maintain said clutch idler pulleys in engaged position, and wherein release mechanism is operatively mounted on said handle and adapted upon operation to release said latch means and in turn said clutch idler pulleys.

3. A power driven lawnmower, comprising, in combination, a frame having an upper transverse member, each end portion of said transverse member having a pair of downwardly extending side members attached thereto, each pair being spaced in their rear portion and the outer one of each pair extending forward of the inner one of each pair, a mower mounting wheel mounted between each pair of side members, at least one of said mounting wheels having drive means fixed thereon to turn therewith, each pair of said side members being joined forward of said wheel mounted therebetween to shield same, a cutting reel transversely mounted between said outer side members forward of said mounting wheels, said reel having drive means operatively connected thereto in one end portion and mounted to turn therewith on the outside of one of said outer side members, an adjustable shear blade mounted between said outer side members in operative relation to said reel, an idler support roller mounted between said outer side members in operative relation to said reel and shear blade, said frame being open centrally between said side members and below said upper transverse frame member from said roller rearward with substantially no obstruction to passage of grass cut by said reel and shear blade and thrown rearwardly therefrom, power means having drive means and mounted on said upper transverse frame member, connecting means operatively connecting said drive means of said power means and said reel drive means, other connecting means operatively connecting said drive means of said power means and said drive means on said mower mounting wheel, and other mower operating means mounted on said upper frame member, and said mower having no portion substantially beyond said reel and shear blade on one end thereof.

References Cited in the file of this patent

UNITED STATES PATENTS

| | | |
|---|---|---|
| 1,687,202 | Haines | Oct. 9, 1928 |
| 2,041,126 | George et al. | May 19, 1936 |
| 2,133,512 | Herge | Oct. 18, 1938 |
| 2,741,890 | Woody | Apr. 17, 1956 |

UNITED STATES PATENT OFFICE

CERTIFICATE OF CORRECTION

Patent No. 2,861,411

November 25, 1958

Frank E. Shock

It is hereby certified that error appears in the printed specification of the above numbered patent requiring correction and that the said Letters Patent should read as corrected below.

Column 2, line 63, strike out "16", second occurrence; same column 2, line 71, and column 3, line 2, strike out "16", each occurrence.

Signed and sealed this 17th day of March 1959.

(SEAL)
Attest:

KARL H. AXLINE
Attesting Officer

ROBERT C. WATSON
Commissioner of Patents